United States Patent
Kim et al.

(10) Patent No.: US 9,341,753 B2
(45) Date of Patent: May 17, 2016

(54) OPTICAL DEVICE AND METHOD OF CONTROLLING PROPAGATION DIRECTIONS OF LIGHT AND SURFACE PLASMON BY USING THE OPTICAL DEVICE

(71) Applicant: SAMSUNG ELECTRONICS CO., LTD., Suwon-si (KR)

(72) Inventors: Jin-eun Kim, Suwon-si (KR); Yeon-sang Park, Seoul (KR); Un-jeong Kim, Hwaseong-si (KR); Young-geun Roh, Seoul (KR); Chang-won Lee, Hwaseong-si (KR); Sang-mo Cheon, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 51 days.

(21) Appl. No.: 14/223,674

(22) Filed: Mar. 24, 2014

(65) Prior Publication Data

US 2014/0376073 A1    Dec. 25, 2014

(30) Foreign Application Priority Data

Jun. 19, 2013    (KR) .................. 10-2013-0070502

(51) Int. Cl.
    *G02F 1/03*    (2006.01)
    *G02B 5/00*    (2006.01)

(52) U.S. Cl.
    CPC ................... *G02B 5/008* (2013.01)

(58) Field of Classification Search
    CPC ....................................................... G02B 5/008
    USPC ............................................................. 359/241
    See application file for complete search history.

(56) References Cited

U.S. PATENT DOCUMENTS

| | | | |
|---|---|---|---|
| 7,869,044 B2 * | 1/2011 | Wang | 356/432 |
| 2003/0132392 A1 * | 7/2003 | Kuroda et al. | 250/397 |
| 2006/0209413 A1 * | 9/2006 | Kim | B82Y 20/00 359/577 |
| 2009/0073434 A1 | 3/2009 | Kim et al. | |
| 2009/0195782 A1 | 8/2009 | Blumberg et al. | |
| 2011/0116168 A1 | 5/2011 | Nikoobakht | |
| 2012/0019901 A1 | 1/2012 | Mazumder | |

FOREIGN PATENT DOCUMENTS

| | | |
|---|---|---|
| KR | 10-2007-0081557 A | 8/2007 |
| KR | 10-2009-0093427 A | 9/2009 |
| KR | 10-2012-0058924 A | 6/2012 |

* cited by examiner

*Primary Examiner* — Thomas K Pham
*Assistant Examiner* — Vipin Patel
(74) *Attorney, Agent, or Firm* — Sughrue Mion, PLLC

(57) ABSTRACT

Provided are an optical device and a method of controlling propagation directions of light and a surface plasmon using the optical device. The optical device includes a light source, a substrate, and a metal layer that is disposed on the substrate, the metal layer includes at least two slots, and propagation directions of light and a surface plasmon may be controlled by using the light that is polarized in a direction parallel to a direction of a long length of any one of the at least two slots.

18 Claims, 6 Drawing Sheets

OPTICAL DEVICE AND METHOD OF CONTROLLING PROPAGATION DIRECTIONS OF LIGHT AND SURFACE PLASMON BY USING THE OPTICAL DEVICE

CROSS-REFERENCE TO RELATED APPLICATIONS

This application claims priority from Korean Patent Application No. 10-2013-0070502, filed on Jun. 19, 2013 in the Korean Intellectual Property Office, the disclosure of which is incorporated by reference herein in its entirety.

BACKGROUND

1. Field

Apparatus and methods consistent with exemplary embodiments relate to optical devices, and methods of controlling propagation directions of light and a surface plasmon by using the optical devices.

2. Description of the Related Art

Many optical devices using light have recently been developed. Because optical devices use light, their signal processing speed is very high. Although electrical devices may be reduced in size to tens to hundreds of nanometers, those electrical devices have a signal process speeds lower than that of optical devices. On the other hand, although optical devices possess high signal processing speeds, it is difficult to manufacture optical devices that are smaller than several μm. This is because the diffraction limit of light makes it difficult to produce optical devices of a size equal to or less than the light's wavelength. Accordingly, this has led to a limitation in the manufacturing of integrated optical circuits using optical devices.

SUMMARY

One or more exemplary embodiments provide optical devices that may control propagation directions of light and a surface plasmon.

One or more exemplary embodiments also provide methods of controlling propagation directions of light and surface plasmons using optical devices.

According to an aspect of an exemplary embodiment, there is provided an optical device including: a substrate; a metal layer that is disposed on the substrate and includes a first slot that extends in a first longitudinal direction a second slot that is spaced apart from the first slot and extends in a second longitudinal direction that is different from the first longitudinal direction; and a light source that is configured to emit light to the metal layer.

The first slot may have a rectangular parallelepiped shape that includes a first side having a first depth, a second side having a first short length, and a third side having a first long length, and the second slot may have a rectangular parallelepiped shape that includes a fourth side having a second depth, a fifth side having a second short length, and a sixth side having a second long length.

A first extension line extends in a direction parallel to the first long length of the third side of the first slot and a second extension line extends in a direction parallel to the second long length of the sixth side of the second slot, and an angle between an intersection of the first extension line and the second extension line may range from 15° to 75°.

A resonance wavelength of the light may be adjusted by changing at least one of the first depth, the second depth, the first short length, the second short length, the first long length, the second long length, and a distance between the first slot and the second slot.

Propagation directions of light and a surface plasmon may be adjusted by adjusting a polarization direction of the light to be parallel to a direction of one of the third side and the sixth side.

Light emitted from the light source may be polarized to have a polarization direction that is parallel to a direction of the first long length of the first slot or to have a polarization direction that is parallel to a direction of the second long length of the second slot.

The optical device may further include a polarizer that is disposed between the light source and the substrate and polarizes light from the light source.

A surface plasmon may be generated at an interface between the substrate and the metal layer or an air and the metal layer.

Each of the sides of the first slot and the second slot may be smaller than a wavelength of light emitted from the light source.

The metal layer may further include a third slot, and the third slot may be inclined with respect to the first slot and the second slot.

The substrate may be formed of $Al_2O_3$, glass, or quartz.

The metal layer may be formed of at least one material selected from the group consisting of titanium (Ti), gold (Au), silver (Ag), platinum (Pt), copper (Cu), aluminum (Al), nickel (Ni), and chromium (Cr), and alloys thereof.

According to an aspect of another exemplary embodiment, there is provided a method of controlling propagation direction of light and a surface plasmon by using an optical device that includes a substrate and a metal layer disposed on the substrate, the method including: forming a first slot in the metal layer, the first slot having a rectangular parallelepiped shape that includes a first side having a first depth, a second side having a first short length, and a third side having a first long length; forming a second slot in the metal layer, the second slot being spaced apart from the first slot and having a rectangular parallelepiped shape that includes a fourth side having a second depth, a fifth side having a second short length, and a sixth side having a second long length; emitting from a light source light that is incident on the metal layer, the light having a polarization direction that is parallel to the third side or a polarization direction is parallel to the sixth side to be incident on the metal layer; generating a surface plasmon at an interface between the substrate and the metal layer or an air and the metal layer due to the light; and resonating the light having the polarization direction that is parallel to the third side in the second slot, or the light having the polarization direction that is parallel to the sixth side in the first slot.

BRIEF DESCRIPTION OF THE DRAWINGS

The above and/or other aspects will become apparent and more readily appreciated from the following description of the embodiments, taken in conjunction with the accompanying drawings of which.

DETAILED DESCRIPTION

Figure 1:
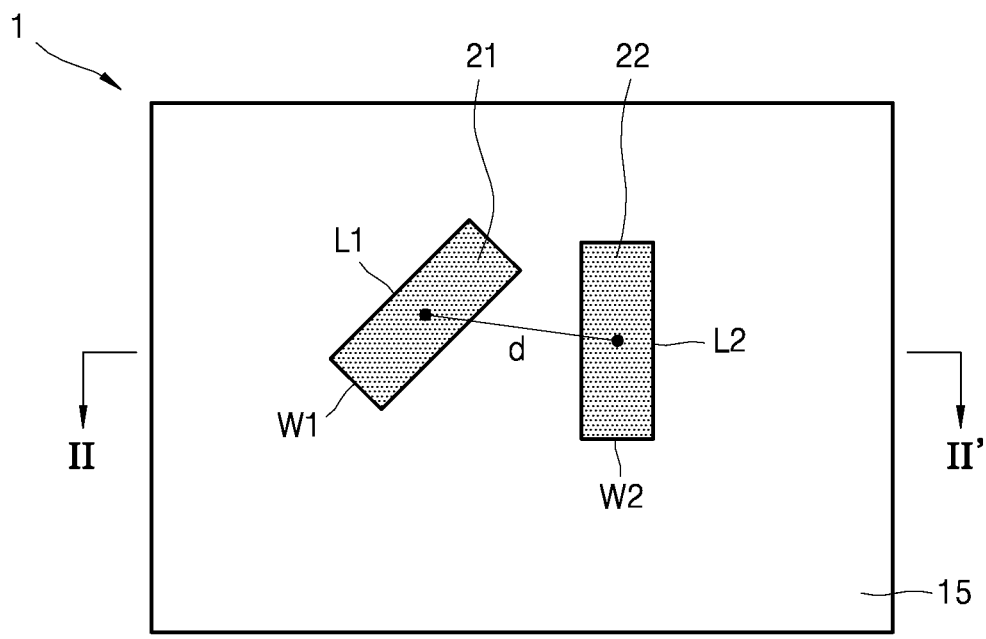
FIG. 1 is a view illustrating an optical device according to an exemplary embodiment.

Reference will now be made in detail to embodiments, examples of which are illustrated in the accompanying drawings. In the drawings, like reference numerals refer to like elements throughout and sizes or thicknesses of elements may be exaggerated for clarity. In this regard, the present exemplary embodiments may have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list.

Figure 2:
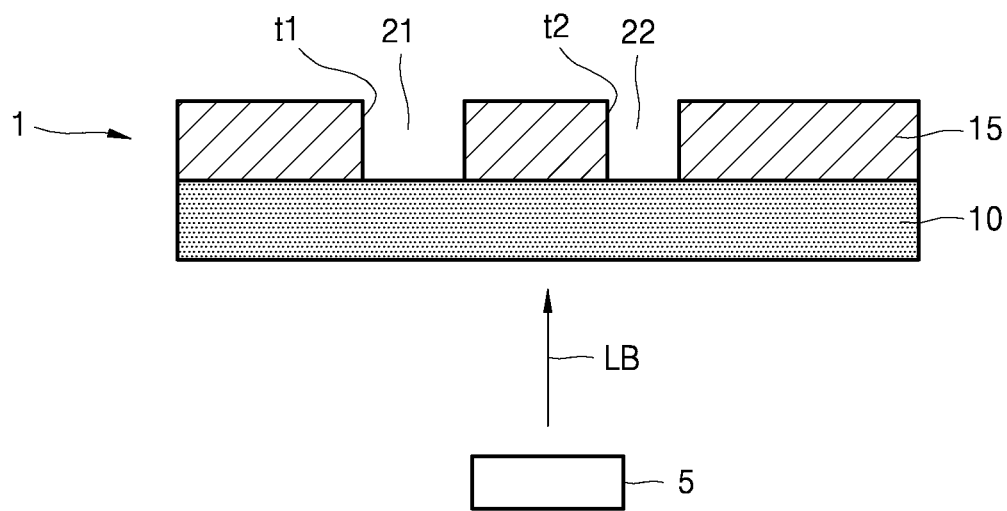
FIG. 2 is a cross-sectional view taken along line II-II' of FIG. 1.

FIG. 1 is a view illustrating an optical device 1 according to an exemplary embodiment. FIG. 2 is a cross-sectional view taken along line II-II' of FIG. 1. The optical device 1 may include a substrate 10, a metal layer 15 that is disposed on the substrate 10, and a plurality of slots that are formed in the metal layer 15. The plurality of slots may include, for example, first and second slots 21 and 22. A light source 5 that emits a light beam LB may be provided under the substrate 10. Although the light source 5 is located under the substrate 10 in FIG. 2, the present embodiment is not limited thereto and the light source 5 may be located over the metal layer 15 so as to emit light toward the metal layer 15.

The metal layer 15 may be coated on the substrate 10, and the first slot 21 and the second slot 22 may be patterned in the metal layer 15. The substrate 10 may be formed from, for example, $Al_2O_3$ or $SiO_2$. The substrate 10 may be formed from, for example, glass or quartz. The metal layer 15 may be formed from at least one metal selected from the group consisting of, for example, titanium (Ti), gold (Au), silver (Ag), platinum (Pt), copper (Cu), aluminum (Al), nickel (Ni), and chromium (Cr), or mixtures or alloys thereof. Alternatively, the metal layer 15 may be formed from an alloy of at least two metals selected from the group consisting of Ti, Au, Ag, Pt, Cu, Al, Ni, and Cr. However, the present embodiment is not limited thereto. The metal layer 15 may have a thickness of, for example, tens to hundreds of nanometers.

The first slot 21 and the second slot 22 may be spaced apart from each other. Each of the first slot 21 and the second slot 22 may have a polygonal cross-sectional shape including, for example, a side having a short length and a side having a long length. The long length may be longer than the short length.

Each of the first slot 21 and the second slot 22 may have, for example, a rectangular parallelepiped shape. The first slot 21 may have a rectangular parallelepiped shape that includes a first side having a first depth t1, a second side having a first short length W1, and a third side having a first long length L1. The second slot 22 may have a rectangular parallelepiped shape that includes a fourth side having a second depth t2, a fifth side having a second short length W2, and a sixth side having a second long length L2.

The first slot 21 and the second slot 22 may be inclined with respect to each other such that the first slot 21 and the second slot extend in different longitudinal directions. That is, the first slot 21 and the second slot 22 may not be parallel to each other, that is, a first extension line extending parallel to the first long length L1 of the third side of the first slot 21 and a second extension line extending parallel to the second long length of the sixth side of the second slot 22 intersect. For example, when a first extension line extending parallel to the first long length L1 of the third side of the first slot 21 and a second extension line extending parallel to the second long length of the sixth side of the second slot 22 meet each other, the angle between the first extension line and the second extension line may range from 15° to 75°.

In the present embodiment, the first depth t1 and the second depth t2 may be equal to or different from each other. The first long length L1 and the second long length L2 may be equal to or different from each other. The first short length W1 and the second short length W2 may be equal to or different from each other. The first long length L1 is greater than the first short length W1. The second long length L2 is greater than the second short length W2.

Figure 3:
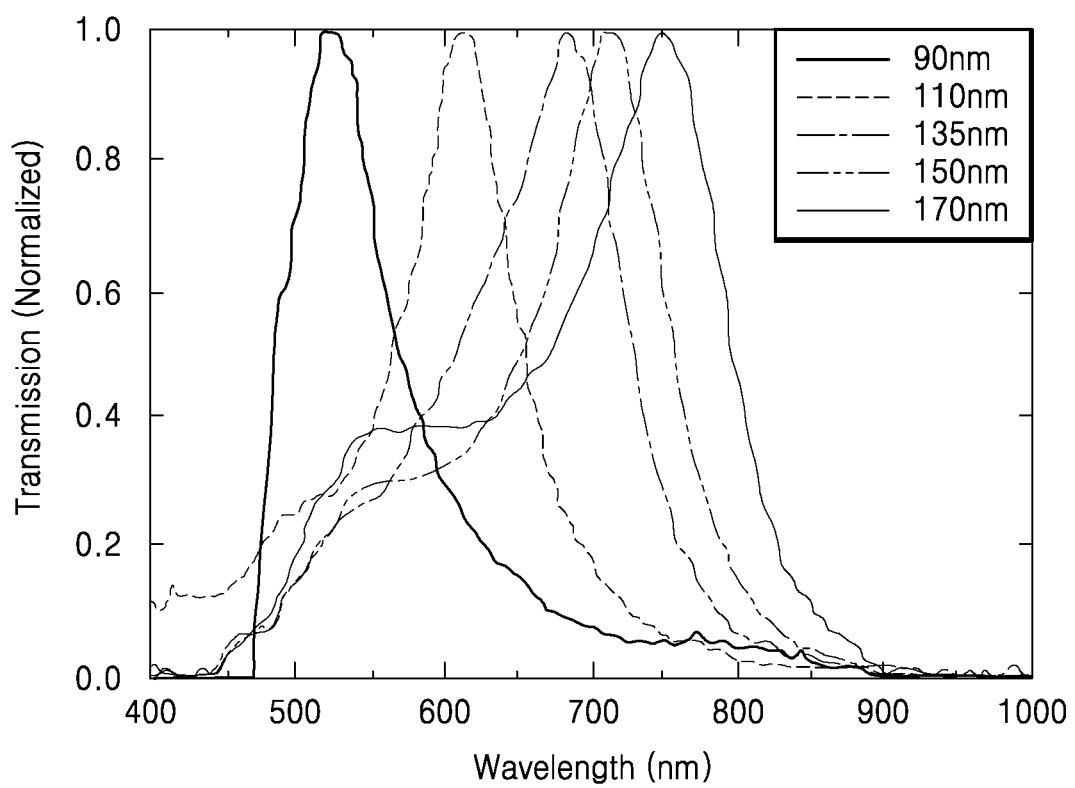
FIG. 3 is a graph illustrating a relationship between wavelength and transmittance when a long length of a slot changes.

FIG. 3 is a graph illustrating a relationship between a wavelength and a transmittance when a long length of a slot is 90 nm, 110 nm, 135 nm, 150 nm, and 170 nm. Resonance may occur at a wavelength having a high transmittance. In this case, a short length of the slot may be 50 nm and a depth of the slot may be 180 nm. A resonance wavelength may be selected by changing the long length of the slot. Although the resonance wavelength is changed by changing the long length of a slot in FIG. 3, the resonance wavelength may also be changed by changing one of a short length and a depth of the slot. Alternatively, the resonance wavelength may be changed by changing at least one of the long length, short length, and depth of the slot. Alternatively, the resonance wavelength of the light beam may be adjusted by changing at least one of the first depth t1, the second depth t2, the first short length W1, the second short length W2, the first long length L1, the second long length L2, and a distance 'd' between the first slot 21 and the second slot 22. The distance 'd' between the first slot 21 and the second slot 22 refers to a distance between a center of the first slot 21 and a center of the second slot 22 (see, e.g., FIG. 1). The first slot 21 and the second slot 22 have rectangular parallelepiped shapes having the same size in FIGS. 1 and 2. In such a case, the first slot 21 and the second slot 22 may have the same resonance wavelength.

The resonance wavelength may be selected by changing the long length of a slot using the results illustrated in FIG. 3. For example, when light having a wavelength of 540 nm is used, the long length of the slot may be designed to be 90 nm.

When a light beam LB is emitted from the light source 5, a surface plasmon may be generated at an interface between the substrate 10 and the metal layer 15 or a surrounding material, for example, an air and the metal layer 15. The surface plasmon may be generated as a result of interactions between the light beam LB incident on the metal layer 15 and electrons existing in the metal layer 15, and electromagnetic energy in the light beam LB may be changed into electron kinetic energy when the motions of the light beam LB and the electrons in the metal layer 15 match. An electromagnetic field generated as a result of the motion of the electrons is called a plasmon, and the plasmon may exist on a surface of the metal layer 15. The light beam LB may be changed into a surface plasmon on the metal layer 15, and the surface plasmon may move along the interface between the substrate 10 and the metal layer 15 or the air and the metal layer 15. A wavelength of the surface plasmon may be shorter than a wavelength of the light beam LB emitted from the light source 5.

Once a surface plasmon is generated at the interface between the substrate 10 and the metal layer 15 or the air and the metal layer 15, part of the surface plasmon may be changed into a light beam in the first slot 21 and/or the second slot 22. Light that is polarized in a direction perpendicular to the long length of a slot resonates and light that is polarized in a direction parallel to the long length does not resonate. For example, when a first light beam polarized parallel to the long length W2 of the second slot 22 is incident, the first light beam (or surface plasmon) may not resonate in the second slot 22, and part of the first light beam (or surface plasmon) may resonate in the first slot 21.

As such, the optical device 1 may select a slot in which light resonates according to the polarization direction of the light beam. A slot in which light resonates may operate as a light feeder or a plasmon feeder. A slot in which light does not resonate may operate as a light reflector or a plasmon reflector.

The operation of the optical device 1 according to an exemplary embodiment will now be explained.

Figure 4A:
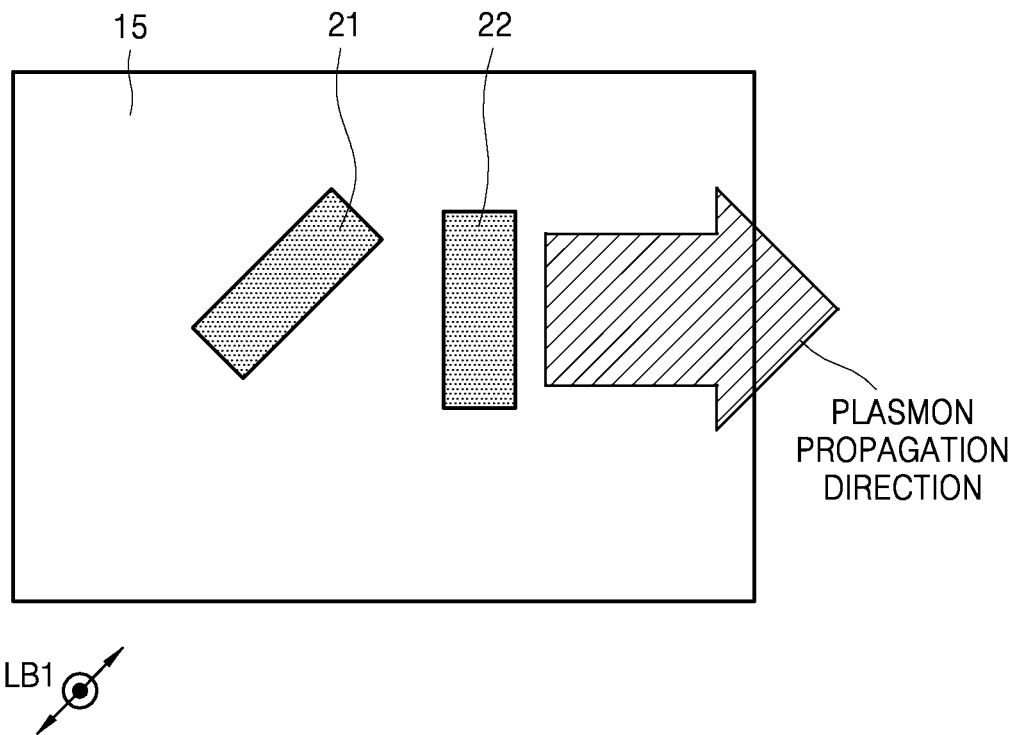
FIG. 4A is a view illustrating a propagation direction of a surface plasmon when a light beam having a first polarization direction is incident on the optical device of FIG. 1.
Figure 4B:
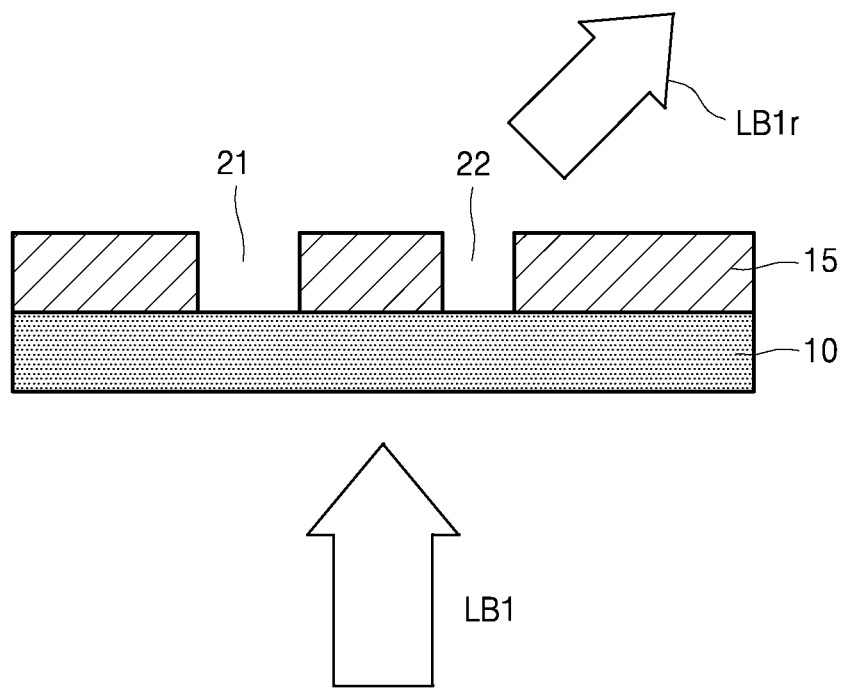
FIG. 4B is a cross-sectional view illustrating a propagation direction of a light beam when a light beam having a first polarization direction is incident on the optical device of FIG. 1.

Referring to FIGS. 4A and 4B, a first light beam LB1 is emitted upward to the substrate 10. The first light beam LB1 may have a wavelength that resonates in the first slot 21 and the second slot 22. However, the present embodiment is not limited thereto, and the first light beam LB1 may have various wavelengths. In this case, only light having a wavelength corresponding to a resonance wavelength in the first slot 21 and the second slot 21 from among the first light beam LB1 may resonate in the first slot 21 and the second slot 22.

The metal layer 15 may generate a surface plasmon due to external light incident thereon. The surface plasmon generated on the metal layer 15 may be coupled into the first slot 21 and the second slot 22 and part of the surface plasmon may be changed into light. When resonating in the first slot 21 and the second slot 22, coupling efficiency may be increased.

For example, when a light beam is polarized in a first polarization direction that is parallel to the long length L1 of the first slot 21, the light beam may not resonate in the first slot 21 and may resonate in the second slot 22. Propagation directions of the light beam and a surface plasmon resonating in the second slot 22 may be controlled by enabling the light beam and the surface plasmon to interact with each other.

The first light beam LB1 may resonate in the first slot 21 or the second slot 22 based on a polarization direction of the first light beam LB1. For example, light having a polarization direction parallel to a direction of the long length of a slot may not resonate, whereas light having a polarization direction parallel to a direction of the short length of the slot may resonate. Accordingly, when the first light beam LB1 has a polarization direction parallel to the direction of the first long length L1 of the first slot 21, the first light beam LB1 may not resonate in the first slot 21 but may resonate in the second slot 22. The second slot 22 in this embodiment is inclined with respect to the first slot 21. Accordingly, the first light beam LB1 in the second slot 22 may have a polarization component that is parallel to the direction of the second short length W2 of the second slot 22. The parallel polarization component may resonate in the second slot 22. As a result, the first light beam LB1 resonates in the second slot 22 and is radiated, and the first light beam LB1 does not resonate in the first slot 21. Accordingly, the first light beam LB1 may be radiated from the second slot 22, and light propagating toward the first slot 21 may be reflected by the first slot 21. Light or a plasmon reflected by the first slot 21 may constructively interfere with light or a plasmon generated in and propagating from the first slot 21 to propagate away from the first slot 21. That is, the second slot 22 may operate a light feeder, and the first slot 21 may operate as a light reflector. Accordingly, as shown in FIG. 4A, a surface plasmon propagates to the right of the second slot 22 as a result of the first light beam LB1. Also, the surface plasmon may interact with the first slot 21, and thus a part of the surface plasmon may be changed into a light beam LB1r and the light beam LB1r may be reflected and radiated from the first slot 21. As shown in FIG. 4B, the light beam LB1r may propagate upward to the right of the second slot 22. Propagation directions of the light beam LB1r and the surface plasmon may be controlled by the first slot 21, which operates as a light reflector.

Figure 5A:
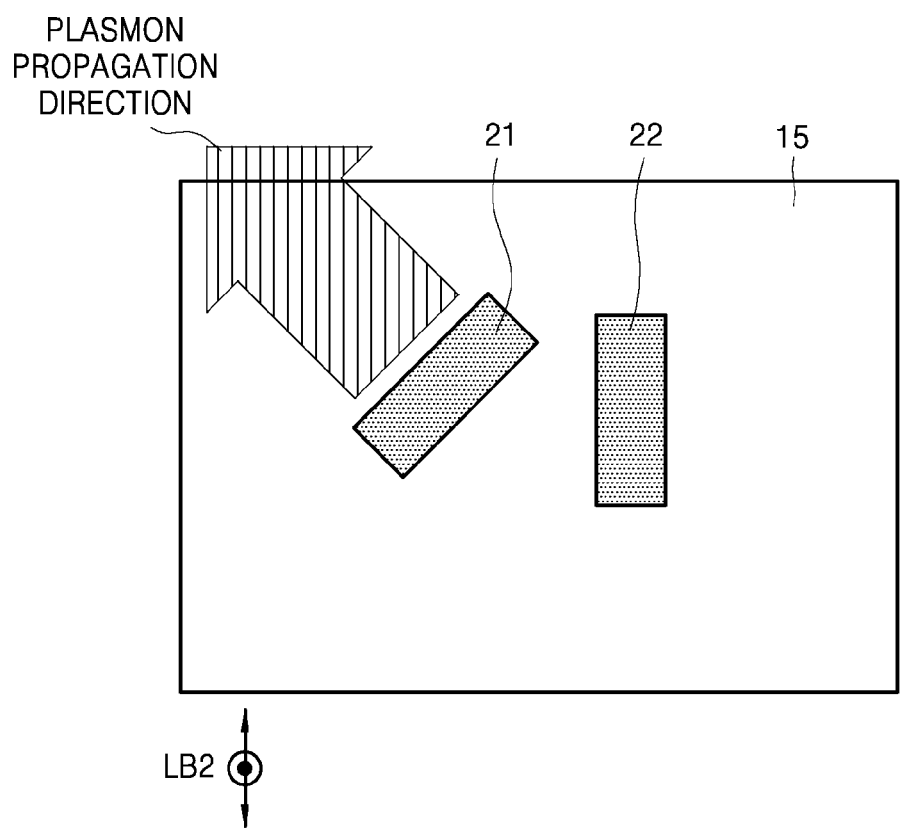
FIG. 5A is a view illustrating a propagation direction of a surface plasmon when a light beam having a second polarization direction is incident on the optical device of FIG. 1.
Figure 5B:
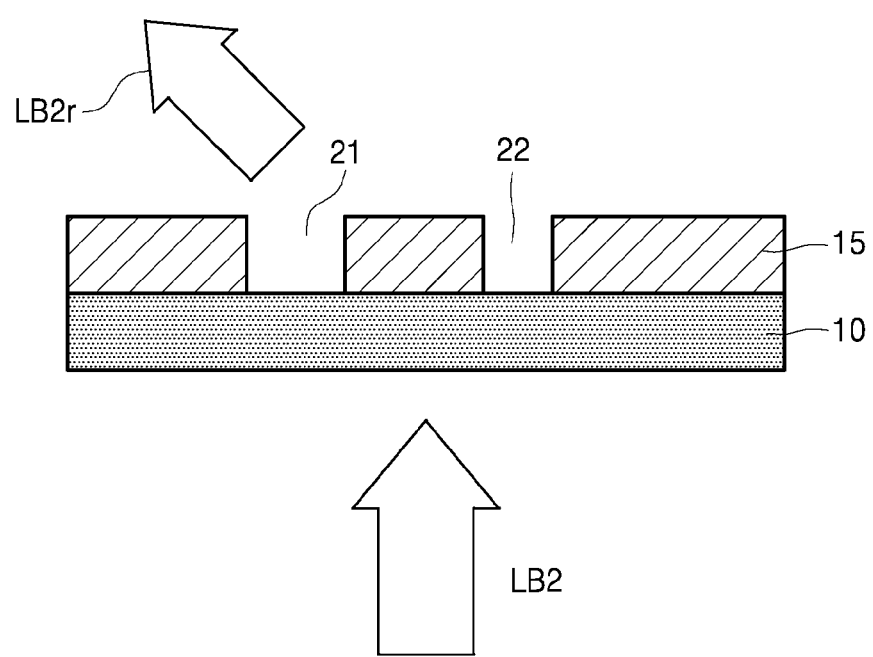
FIG. 5B is a cross-sectional view illustrating a propagation direction of a light beam when a light beam having a second polarization direction is incident on the optical device of FIG. 1.

FIGS. 5A and 5B are views illustrating propagation directions of a light beam and a surface plasmon when a second light beam LB2 having a second polarization direction parallel to a direction of the second long length L2 of the second slot 22 is used. The second light beam LB2 having the second polarization direction may not resonate in the second slot 22, but may resonate in the first slot 21. A polarization component of the second light beam LB2 having the direction of a short length of first slot 21 may resonate in the first slot 21. The first slot 21 may operate as a light feeder and the second slot 22 may operate as a light reflector in this embodiment. Accordingly, as shown in FIG. 5A, a surface plasmon propagates upward and leftward as a result of the second light beam LB2. Also, the surface plasmon may interact with the second slot 22, and thus a part of the surface plasmon may be changed into a light beam LB2r and the light beam LB2r may be reflected and radiated from the second slot 22. As shown in FIG. 5B, the light beam LB2r may propagate upward to the left of the first slot 21. Propagation directions of the light beam LB2r and the surface plasmon may be controlled by the second slot 22, which operates as a light reflector.

As described above, the optical device 1 of the present embodiment may transmit a surface plasmon and light, and may adjust the propagation directions of the light and the surface plasmon. The optical device 1 of the present embodiment having such properties may be used in or as an optical antenna or an optical switch.

Figure 6:
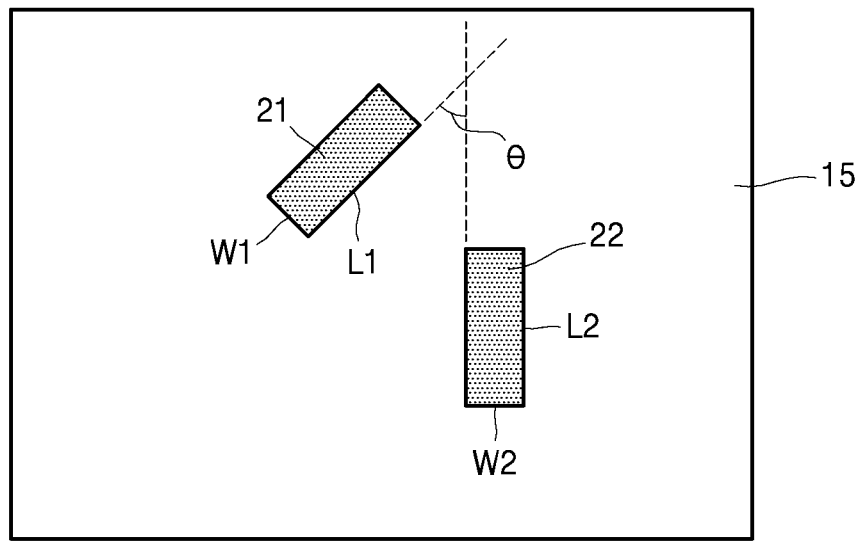
FIG. 6 is a view illustrating an example where relative positions of the first slot and the second slot in the optical device of FIG. 1 are changed.

FIG. 6 is a plan view illustrating an example where an angle θ between the first slot 21 and the second slot 22 is maintained but where relative positions of the first slot 21 and the second slot 22 are changed, as compared to FIG. 1. In this case, for example, light having a polarization direction parallel to the first long length L1 of the first slot 21 may not resonate in the first slot 21, but may resonate in the second slot 22. The resonating light may propagate to the left and right of the second slot 22 in FIG. 6. Light propagating to the left of the second slot 22 may be reflected as the result of interactions with the first slot 21 and may propagate to the right of the second slot 22.

Figure 7:
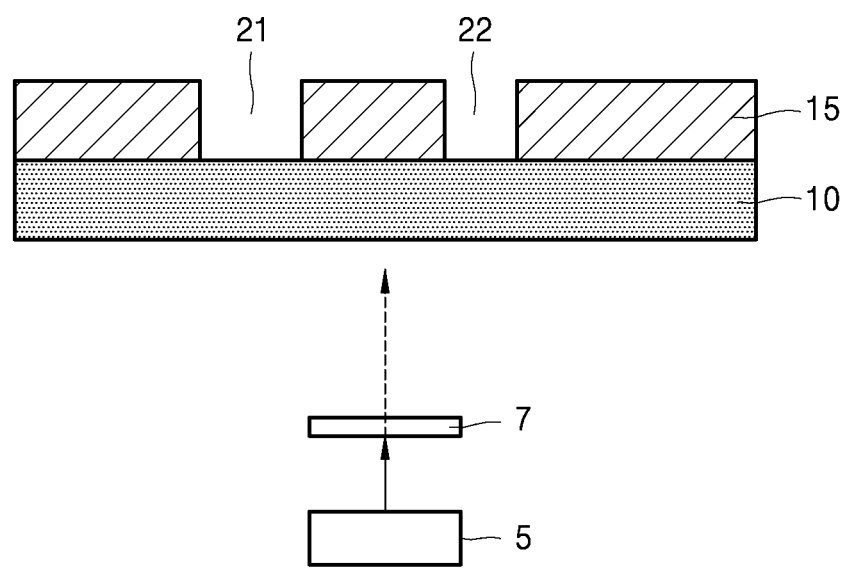
FIG. 7 is a cross-sectional view illustrating an example where the optical device of FIG. 1 further includes a polarizer.

FIG. 7 is a cross-sectional view illustrating an example where the optical device 1 of FIG. 1 further includes a polarizer 7 that is disposed between the light source 5 and the substrate 10. The polarizer 7 changes the light emitted from the light source 5 into light having one polarization direction. For example, the polarizer 7 may change incident light into light having a polarization direction parallel to a direction of the first long length L1 of the first slot 21, or into light having a polarization direction parallel to a direction of the second long length L2 of the second slot 22.

Figure 8:
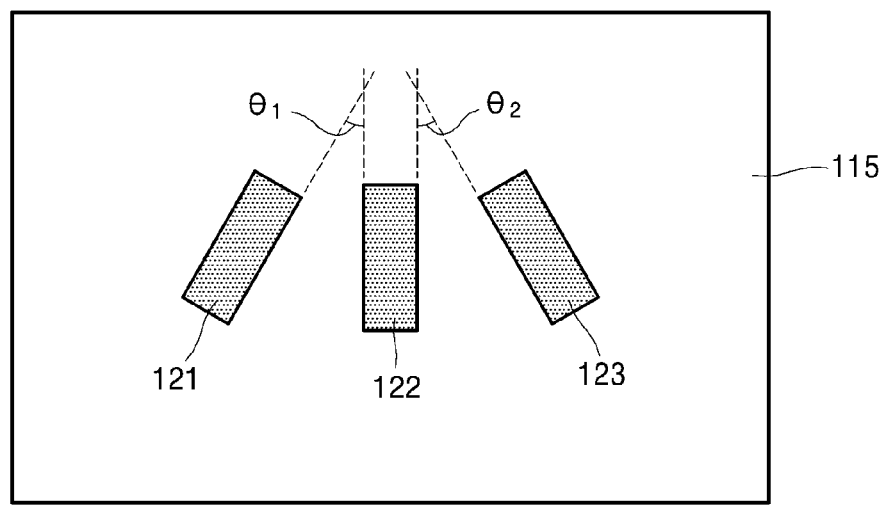
FIG. 8 is a view illustrating an optical device including a metal layer in which three slots are formed.

FIG. 8 is a view illustrating an optical device including a metal layer 115 in which, for example, a first slot 121, a second slot 122, and a third slot 123, are formed. Each of the first slot 121, the second slot 122, and the third slot 123 may have a rectangular parallelepiped shape having a depth, a long length, and a short length. The first slot 121, the second slot 122, and the third slot 123 may be disposed such that directions of the long lengths are inclined at different angles. When an extension line extending in the direction of the long length of the first slot 121 and an extension line extending in the direction of the long length of the second slot 122 meet each other, the first angle between the two extension lines is $\theta_1$. When an extension line extending in the direction of the long length of the second slot 122 and an extension line extending in the direction of the long length of the third slot 123 meet each other, the second angle between the two extension lines is $O_2$. The first angle $\theta_1$ and the second angle $\theta_2$ may be equal to or different from each other. When light having a polarization direction parallel to any one of the long lengths of the first through third slots 121, 122, and 123 is incident on the metal layer 115, the light may not resonate in the slot having the long length that is parallel to the polarization direction, but may resonate in the other slots. The slot having the long length parallel to the polarization direction may operate as a light reflector, and the other two slots may operate as light feeders. Propagation directions of light and a surface plasmon may be controlled as a result of the slot that operates as a light reflector.

For example, when a light beam that is polarized in a direction parallel to the long length of the second slot 122 is incident, the light beam and a surface plasmon may resonate and be radiated from the first slot 121 and the third slot 123. The light beam and the surface plasmon radiated from the first slot 121 may be reflected by the second slot 122 and may propagate leftward in FIG. 8. The light beam and the surface plasmon radiated from the third slot 123 may be reflected by the second slot 122 and may propagate rightward in FIG. 8.

Although three slots are shown in FIG. 8, light and a surface plasmon may be transmitted in various directions according to the number and arrangement directions of the slots.

As described above, the optical device of the present exemplary embodiment may control the propagation directions of light and a surface plasmon.

A method of controlling the propagation directions of light and a surface plasmon by using an optical device according to an embodiment herein will now be explained. Referring to FIGS. 1 and 2, the metal layer 15 is disposed on the substrate 10, and the first slot 21 and the second slot 22 are formed in the metal layer 15 so as to be inclined with respect to each other. The first slot 21 may have a rectangular parallelepiped shape including a first side having a first depth t1, a second side having a first short length W1, and a third side having a first long length L1. The second slot 22 may have a rectangular parallelepiped shape including a fourth side having a second depth t2, a fifth side having a second short length W2, and a sixth side having a second long length L2.

A light beam having a polarization direction parallel to the third side may be incident on the metal layer 15. Alternatively, a light beam having a polarization direction parallel to the sixth side may be incident on the metal layer 15.

A surface plasmon may be generated at an interface between the substrate 10 and the metal layer 15 or an air and the metal layer 15 as a result of the light beam. The polarization direction of the light beam may be selected so as to avoid the light beam resonating in either the first slot 21 or the second slot 22. For example, a light beam having a polarization direction parallel to the third side may not resonate in the first slot 21, but may resonate in the second slot 22. Alternatively, a light beam having a polarization direction parallel to the sixth side may not resonate in the second slot 22, but may resonate in the first slot 21. Propagation directions of the light beam and the surface plasmon may be controlled by interactions between the resonating light beam and the other slot in which resonance does not occur. As such, the method of the present embodiment may control propagation directions of a light beam and a surface plasmon based on a polarization direction of the light beam.

It should be understood that the exemplary embodiments described herein should be considered to be descriptive only and not limiting. Descriptions of features or aspects within each exemplary embodiment should typically be considered as being available for other similar features or aspects in other embodiments.

What is claimed is:

1. An optical device comprising:
    a substrate;
    a metal layer that is disposed on the substrate, the metal layer having a first slot that extends in a first longitudinal direction and a second slot that is spaced apart from the first slot and extends in a second longitudinal direction that is different from the first longitudinal direction; and
    a light source that is configured to emit light to the metal layer,
    wherein the first longitudinal direction and the second longitudinal direction are not parallel, and
    one of the first slot and the second slot is constructed to resonate light which polarizes the light emitted from the light source and the other of the first slot and the second slot is constructed to adjust propagation directions of the light.

2. The optical device of claim 1, wherein the first slot has a rectangular parallelepiped shape that comprises a first side having a first depth, a second side having a first short length, and a third side having a first long length,
    the second slot has a rectangular parallelepiped shape that comprises a fourth side having a second depth, a fifth side having a second short length, and a sixth side having a second long length, and
    the first long length is longer than the first short length, and the second long length is longer than the second short length.

3. The optical device of claim 2, wherein a first extension line extends in a direction parallel to the first long length of the third side of the first slot,
    a second extension line extends in a direction parallel to the second long length of the sixth side of the second slot, and
    an angle between an intersection of the first extension line and the second extension line ranges from 15° to 75°.

4. The optical device of claim 2, wherein a resonance wavelength of the light is adjusted by changing at least one of the first depth, the second depth, the first short length, the second short length, the first long length, the second long length, and a distance between the first slot and the second slot.

5. The optical device of claim 2, wherein propagation directions of the light emitted from the light source and a surface plasmon generated at an interface between the substrate and the metal layer or an air and the metal layer are adjusted by adjusting a polarization direction of the light to be parallel to a direction of one of the third side and the sixth side.

6. The optical device of claim 5, wherein the light emitted from the light source is polarized to have a polarization direction parallel to a direction of the first long length of the first slot or to have a polarization direction parallel to a direction of the second long length of the second slot.

7. The optical device of claim 1, further comprising a polarizer that is disposed between the light source and the substrate and polarizes the light emitted from the light source.

8. The optical device of claim 1, wherein a surface plasmon is generated at an interface between the substrate and the metal layer or an air and the metal layer.

9. The optical device of claim 2, wherein each of the sides of the first slot and the second slot has a size smaller than a wavelength of the light emitted from the light source.

10. The optical device of claim 1, wherein the metal layer further comprises a third slot that is inclined with respect to the first slot and the second slot.

11. The optical device of claim 1, wherein the substrate is formed of $Al_2O_3$, glass or quartz.

12. The optical device of claim 1, wherein the metal layer is formed of at least one selected from the group consisting of titanium (Ti), gold (Au), silver (Ag), platinum (Pt), copper (Cu), aluminum (Al), nickel (Ni), chromium (Cr), and alloys thereof.

13. A method of controlling propagation directions of light and a surface plasmon by using an optical device comprising a substrate and a metal layer that is disposed on the substrate, the method comprising:

forming a first slot in the metal layer, the first slot extending in a first longitudinal direction and having a rectangular parallelepiped shape that comprises a first side having a first depth, a second side having a first short length, and a third side having a first long length;

forming a second slot in the metal layer, the second extending in a second longitudinal direction that is different from the first longitudinal direction, being spaced apart from the first slot and having a rectangular parallelepiped shape that comprises a fourth side having a second depth, a fifth side having a second short length, and a sixth side having a second long length;

emitting from a light source light that is incident on the metal layer, the light having a polarization direction that is parallel to the third side or a polarization direction that is parallel to the sixth side;

generating a surface plasmon at an interface between the substrate and the metal layer or an air and the metal layer due to the light; and resonating the light having the polarization direction that is parallel to the third side in the second slot or the light having the polarization direction that is parallel to the sixth side in the first slot, wherein the first longitudinal direction and the second longitudinal direction are not parallel, and one of the first slot and the second slot s constructed to resonate light which polarizes the light emitted from the light source and the other of the first slot and the second slot is constructed to adjust propagation directions of the light.

14. The method of claim 13, wherein the first slot has a first extension line that extends parallel to the first long length of the third side of the first slot, the second slot has a second extension line that extends parallel to the second long length of the sixth side of the second slot intersect, and an angle between an intersection of the first extension line and the second extension line ranges from 15° to 75°.

15. The method of claim 13, further comprising adjusting a resonance wavelength of the light by changing at least one of the first depth, the second depth, the first short length, the second short length, the first long length, the second long length, and a distance between the first slot and the second slot.

16. The method of claim 13, further comprising adjusting propagation directions of the light and the surface plasmon by adjusting a polarization direction of the light to be parallel to one of the third side and the sixth side.

17. The method of claim 16, wherein the light emitted from the light source is polarized to have a polarization direction parallel to the first long length of the first slot or to have a polarization direction parallel to the second long length of the second slot.

18. The method of claim 13, further comprising forming a third slot in the metal layer, wherein the third slot extends in a third longitudinal direction that is different from the first longitudinal direction and the second longitudinal direction.

* * * * *